Jan. 11, 1966  B. W. POEHLMAN  3,229,204
PHASE METER CALIBRATOR
Filed March 25, 1963

INVENTOR
BARRY W. POEHLMAN

BY  *Claude Funkhouser*
  ATTORNEY

*James E. Snead* AGENT

3,229,204
PHASE METER CALIBRATOR
Barry William Poehlman, Linthicum, Md., assignor, by mesne assignments, to the United States of America as represented by the Secretary of the Navy
Filed Mar. 25, 1963, Ser. No. 267,871
2 Claims. (Cl. 324—83)

The present invention relates to a means for calibrating phase meters. More particularly, the present invention relates to a digital means for measuring phase difference between two electrical signals so that a device for measuring electrical phase may be calibrated.

Many devices have been provided in the prior art for measuring phase shift, and for calibrating phase measuring devices. Most of these prior art devices, however, employ analog techniques. Analog techniques require the conversion of the phase to be measured to a voltage level and the measurement of this voltage by a D.C. voltmeter. Both the conversion of the phase angle to a D.C. voltage level and the measurement of this voltage level by a D.C. voltmeter can introduce considerable error into the measuring system, and thus nullify the usefulness of the device for calibration purposes.

Therefore, it is an object of this invention to provide a device for measuring phase angles in an electrical circuit by means of a digital, electronic measuring system.

It is a further object of the present invention to provide a device for measuring phase shift in electrical circuitry wherein the phase shift readout means is a digital, electronic time interval meter whereby the phase difference is recorded in time increments.

It is a further object of the present invention to provide a means for measuring phase differences between two electrical signals wherein the difference is indicated digitally by measuring the time interval between corresponding parts of the two electrical signals.

A further object of the present invention is to provide a phase digital measuring meter that is easily adjusted to compensate for errors introduced due to circuit parameters.

Other objects, advantages and novel features of the invention will become apparent from the following detailed description of the invention when considered in conjunction with the accompanying drawings wherein.

Figure 1:
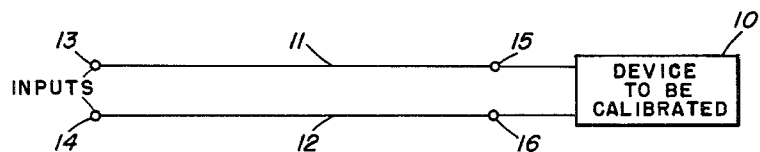
FIG. 1 is a block diagram showing the two inputs to a device to be calibrated by the present invention.

Referring now to FIG. 1 there is shown a device for measuring phase difference such as any standard phase meter 10, having two inputs 13 and 14 wherein two separate signals are coupled into device 10 through lines 11 and 12. Contacts 15 and 16 indicate pick-off points for the calibrating system of the present invention.

Figure 2:
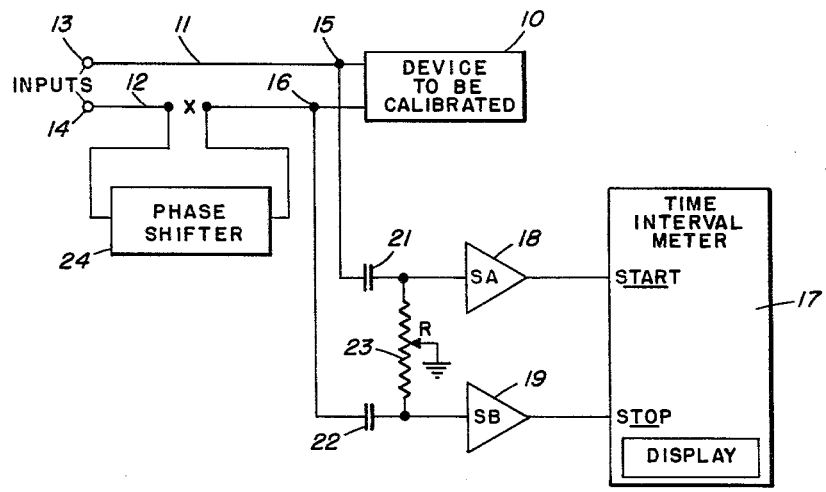
FIG. 2 is a showing of the device to be calibrated along with the time interval meter and accompanying circuitry necessary to measure the phase shift introduced into the device to be calibrated.

As shown in FIG. 2, a time interval meter 17 is inserted in parallel with the device 10 to be calibrated along with its accompanying circuitry so that the time difference between the electrical signals at 13 and 14 may be measured in a manner to be hereinafter more particularly described. In the calibration procedure a phase shift is deliberately introduced between the two inputs 13 and 14 by means of a phase shifter 24 located in series in line 12. This phase shifter 24 should be capable of producing a phase shift over the range of interest, i.e., the range of phase difference to which device 10 may be required to measure. Further, phase shifter 24 should have negligible effect on the input signal amplitude and waveshape.

Time interval meter 17 is any standard meter which employs a start input and a stop input and measures the time between the start and stop signals. This measurement is used to indicate the phase difference in a manner to be hereinafter more particularly described. The input to the time interval meter 17 is provided through squaring amplifiers 18 and 19, and capacitors 21 and 22 in conjunction with potentiometer 23. The function of amplifiers 18 and 19 is to produce square wave outputs whose leading and trailing edges correspond to the points at which the input waveform at pick-off points 15 and 16 cross the average zero axis. In this manner, the time interval between corresponding points on the signals sampled at pick-off points 15 and 16 is measured by the time interval meter 17 to obtain an accurate indication of the time interval between the two signals. The squaring amplifiers 18 and 19 should preferably have very high gain so that the rise and fall times of the output pulses is very small. These amplifiers should also be A.C. coupled and have symmetrical clipping levels to prevent a shift in the average zero axis. Capacitors 21 and 22 along with potentiometer 23 provide the input to squaring amplifiers 18 and 19. The purpose of the adjustment on potentiometer 19 is to allow for zero adjust of the time interval meter. The capacitance of capacitors 21 and 22 is the same. The phase shift in each signal passing through the R.C. circuits is equal at the input to the amplifiers when potentiometer 23 is set in the center of the resistor. As the pick-off point of potentiometer 23 is varied, the signal to one of the amplifiers 18 or 19 is caused to have a greater lead while the opposite amplifier has less lead. This circuit allows insertion of a relative lead or lag, depending upon the direction of rotation of potentiometer 23 so that the time interval appearing on the meter 17 may be adjusted.

Thus, it can be seen that phase shifter 24 may be adjusted to set an arbitrary zero on the device to be calibrated. This zero is then set to obtain a reference number on the meter. The reference number should not be zero since such an adjustment would make the meter subject to inaccuracies introduced by noise in the circuitry. When excessive noise exists, a filter can be inserted at the input to each squaring amplifier 18 and 19, but the phase shift imparted to the signals by different filter characteristics must be taken into account. This phase unbalance can be minimized by using the change in phase method of the capacitors and potentiometer along with the zero adjust.

In operation, the electrical signals at inputs 13 and 14 are fed via the zero adjust network to pick-off points 15 and 16, and, thence, to squaring amplifiers 18 and 19, respectively. The outputs of the squaring amplifiers are applied to electronic digital time interval meter 17. Due to the difference in phase of the two signals at squaring amplifiers 18 and 19, the output of amplifier 18 will initiate counting action in the time interval meter, and the output pulse from squaring amplifier 19 will stop the counting operation. The time interval between the start and stop pulses can be taken as an indication of the phase difference between the two signals at inputs 13 and 14. The time interval meter start and stop circuits should be designed to respond only to pulses of one polarity; for instance, the positive polarity so that like parts of each pulse will actuate their respective circuits. In this manner, the pulses generated by squaring amplifiers 18 and 19 will start and stop the meter respectively at corresponding points on the waveforms at inputs 13 and 14 so that the phase angles can be obtained by mathematical computation.

If the time interval meter was provided with an automatic recycling feature, the measurement could be made and displayed at a varying rate, for instance, one cycle/ second. In this manner, the noise present in the signal could be integrated out by eye. This is done by observing the span of the least significant digit for many reading cycles and taking the average.

The measurement of the phase angle by the present system in terms of time is obtained as follows:

(1) The time interval, T, of one cycle of a frequency, $f$, is equal to $1/f$.

(2) Since one cycle equals 360°, the time interval of one degree equals $T/360 = 1/360f$.

(3) The time interval, $t$, between the same point on two identical waveforms which are separated by a phase angle of $\theta$ degrees is therefore:

$$t = \theta \times 1/360f$$

or $$\theta = 360t \times f$$

The polarity of the phase angle, i.e., whether the signal at input 13 leads or lags, that at input 14 can be determined as follows.

The start event occurs first in the display cycle, thus, the waveform ultimately applied at the start input may be said to be leading that applied to the stop input by an amount $t$. Thus, the signal at point 15 may be said to be leading that at point 16, or conversely, the signal at point 16 may be said to be lagging at point 15. Since the phase angle $\theta = -(360 - \theta)$, the terms "lead" and "lag" are generally restricted to angles of less than 180°. Thus, an angle $\theta$ obtained from the above equation may be said to be lagging at point 16 but if it is greater than 180° it is better described as leading at point 16 by an angle of $360° - \theta$.

With present day digital meters, the most significant sources of error using the present technique are the accuracy with which the frequency is known, and the smallest increment of time employed to digitize the time interval. Since most time interval meters have provisions for measuring frequency, the first error may be reduced to the basic one digit accuracy of the meter. The accuracy for which the frequency is known can be computed by use of the time increment employed. Once this value is known, its effect on the accuracy of the meter can be allowed for.

Obviously many modifications and variations of the present invention are possible in the light of the above teachings. It is therefore to be understood that within the scope of the appended claims the invention may be practiced otherwise than as specifically described.

What is claimed is:

1. In a device for measuring phase shift in a plurality of electrical circuits the combination comprising
   first and second input means for receiving two incoming signals;
   phase shift means serially connected between one of said input means and the remainder of the circuit for changing the phase of the signal into the one input means by a fixed amount relative to the phase of the signal in the other of said input means;
   first and second squaring amplifiers connected to said first and second input means for converting the input signals into square waves;
   first and second capacitors, each being of like value and serially connected in the input of said first and second squaring amplifiers;
   a variable resistance having its sliding contact grounded and its ends connected to the inputs of the squaring amplifiers, so that the combination of said capacitors and said variable resistance provides a variable lead time for one square wave relative to the other square wave; and
   digital counter means connected to the output of the squaring amplifiers and actuated sequentially by said square waves for measuring the time interval between like points on the square waves to indicate the phase difference between the two incoming signals at the first and second inputs of said device.

2. A device for indicating the error in a phase measuring device having a plurality of inputs for receiving a plurality of incoming electrical signals, the combination comprising
   a device to be calibrated;
   phase shifting means connected in series with one of the inputs to the device to be calibrated;
   a pick-off means connected to each of the plurality of inputs of said device to be calibrated for sampling each of the signals into said inputs;
   a square wave amplifier coupled to each of the pick-off means for converting the signals sampled from the inputs into a plurality of square waves;
   a capacitance means serially connected in each of the pick-off means;
   variable resistance means having its sliding contact grounded and its ends connected to the inputs of said square wave amplifiers whereby the lead time of the input signal to each of the square wave amplifiers may be varied; and
   digital counter means sequentially actuated by the output of the square wave amplifiers, said digital counter means including a start means connected to the output of one of said square wave amplifiers and a stop means connected to the output of the other square wave amplifier, the start and stop means each being adapted to be actuated by its respective square wave amplifier whereby the digital counter means measures the time interval between like points on each of the square waves to indicate the phase difference between the two signals at the input of the device being calibrated.

References Cited by the Examiner

UNITED STATES PATENTS 2,918,625    12/1959    Houghton et al. _____ 324—83
3,047,810    5/1962    Tvedt _____ 324—89 X WALTER L. CARLSON, *Primary Examiner.*

P. F. WILLE, *Assistant Examiner.*